(12) United States Patent
Wang et al.

(10) Patent No.: US 8,538,210 B2
(45) Date of Patent: Sep. 17, 2013

(54) MICRO FREE-SPACE WDM DEVICE

(75) Inventors: Daoyi Wang, Sunnyvale, CA (US); Frank Wu, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 586 days.

(21) Appl. No.: 12/493,855

(22) Filed: Jun. 29, 2009

(65) Prior Publication Data

US 2010/0329678 A1 Dec. 30, 2010
US 2012/0237222 A9 Sep. 20, 2012

Related U.S. Application Data

(63) Continuation-in-part of application No. 11/669,947, filed on Feb. 1, 2007, now Pat. No. 7,843,644.

(51) Int. Cl.
*G02B 6/34* (2006.01)
*G02B 6/32* (2006.01)

(52) U.S. Cl.
USPC ............. 385/36; 385/15; 385/16; 385/17; 385/18; 385/20; 385/22; 385/31; 385/33; 385/34; 385/39; 385/47; 385/50

(58) Field of Classification Search
USPC .................................. 385/22, 34, 36
See application file for complete search history.

(56) References Cited

U.S. PATENT DOCUMENTS

| | | | |
|---|---|---|---|
| 5,583,683 A | 12/1996 | Scobey | |
| 5,859,717 A * | 1/1999 | Scobey et al. | 398/79 |
| 6,750,969 B2 * | 6/2004 | Richard et al. | 356/399 |
| 6,847,450 B2 | 1/2005 | Richard | |
| 7,068,880 B2 | 6/2006 | Smaglinski | |
| 7,843,644 B1 * | 11/2010 | Wang et al. | 359/641 |

* cited by examiner

*Primary Examiner* — Ryan Lepisto
(74) *Attorney, Agent, or Firm* — Wuxi Sino-IP Agency; Joe Zheng

(57) ABSTRACT

Techniques for designing optical devices that can be manufactured in volume are disclosed. In an exemplary an optical assembly, to ensure that all collimators are on one side to facilitate efficient packaging, all collimators are positioned on both sides of a substrate. Thus one or more beam folding components are used to fold a light beam up and down through the collimators on top of the substrate and bottom of the substrate.

17 Claims, 12 Drawing Sheets

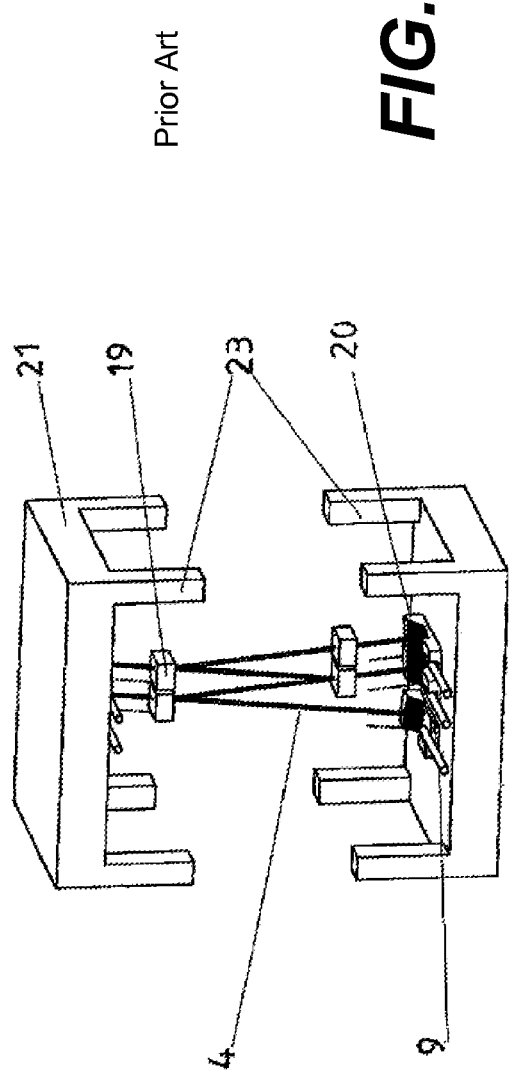
FIG. 5 Prior Art
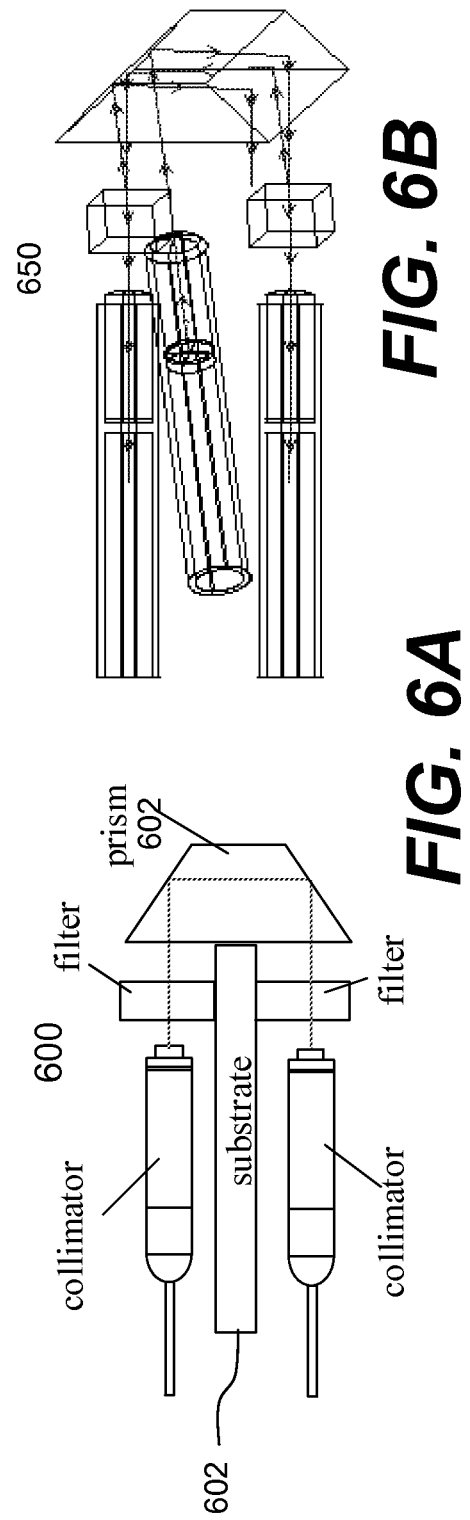
FIG. 6A
FIG. 6B

MICRO FREE-SPACE WDM DEVICE

CROSS REFERENCE

This application is a continuation-in-part of co-pending U.S. application Ser. No.: 11/669,947 filed Feb. 1, 2007, now U.S. Pat. No.: 7,843,644, and related to U.S. Pat. No.: 11/379,788, commonly assigned, entitled "Optical devices and method for making the same", now U.S. Pat. No.: 7,224,865.

BACKGROUND OF THE INVENTION

1. Field of the Invention

The invention is generally related to the area of optical devices. In particular, the present invention is related to optical wavelength multiplexing/demultiplexer or add/drop devices with new optical layouts and manufacturing processes.

2. The Background of Related Art

Optical add/drop and multiplexer/demultiplexer devices are optical components often used in optical systems and networks. These devices using wavelength division multiplexing (WDM) techniques allow a simultaneous transfer of optical signals at different wavelengths or channels through a single optical link such as an optical fiber. In operation, a WDM device or system may need to drop or add a set of channels from or to a transmitting signal. Multiplexer/demultiplexer (Mux/Demux) is often needed for this application.

FIG. 1 replicates a WDM device disclosed in U.S. Pat. No. 5,583,683. A multiple wavelength light beam traveling in a fiber is separated into multiple narrow spectral bands, each directed to an individual port. At each of the ports for a channel, a dielectric thin film filter is used to transmit a specified wavelength in the multi-wavelength (collimated) light passed by the port but reflects all other wavelengths. The remaining of the multi-wavelength signal continues to a next channel port, where an in-band signal at a specific wavelength is transmitted and all others are reflected. The remaining of the multi-wavelength signal continues to propagate along an optical path. After multiple bounces, signals at different wavelengths are separated. Compared with a conventional three-port cascading modules, the dimension of the device of FIG. 1 is small in size as fiber routing in the three-port modules are replaced with collimated beams, thus the routing overhead is saved.

It is well known that a fiber is not allowed to bend too small. For example, for the widely used SMF-28e fiber, the minimum bend radius is about 30 mm. When being routed, the fiber roll wastes a specific space, for example, 60 mm in diameter for SMF-28e fiber. Without fiber routing, a WDM device box could be even smaller than a square of 30 mm by 30 mm.

Even so, for the prior art device of FIG. 1, the fiber input/output (I/O) ports are positioned on both sides of a mechanical box. In the process of fiber handling, due to the minimum radius limitation, the space waste could be doubled as shown in FIG. 2A. One of the features, objects and advantages of the current invention as will be described below is to have all the I/O ports deposed on one side of a device as shown in FIG. 2B. For a one-sided device, as the I/O ports are on one side of the device, thus fiber routing could be eliminated.

The one-sided optical layout is realized by beam folding components. Prisms or mirrors are commonly used as beam folding components as shown in FIGS. 3A-3C. These components are all to be used and covered by different embodiments of the present invention.

FIG. 4 replicates an optical device of U.S. Pat. No. 6,847,450 using turning prisms to bend light beams from adding channel collimators vertical to the main plane (beam cascading plane). Compared with the prior art device of FIG. 1, the length of the device of FIG. 4 is reduced by a collimator length, but it is at the cost of the height as the cascading optics is now along with the height dimension of the device of FIG. 4.

FIG. 5 replicates a device of U.S. Pat. No. 7,068,880 that is similar to that of FIG. 4. The major difference is that in U.S. Pat. No. 7,068,880, the beam bending is at the collimator lens while in U.S. Pat. No. 6,847,450 the bending occurs after collimators. In either case, the beams are bent by 90 degrees. The common problem is that the height of the device is now big. As will be described below, the beams are also turned twice to reduce the height of a resulting device. Further unlike these prior art devices, the beam folding occurs along a zigzag optical path, resulting in the height being smaller, compared with prior art devices of FIG. 4 and FIG. 5. As will be appreciated from the disclosure herein, the height of the prior art devices is the width of the zigzagging optics (typically >5 mm) plus two collimator mounting space while the height of a device designed in accordance with the present disclosure is the height of a substrate (typically ~2 mm) plus two collimator spaces.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to improved designs of optical devices, particularly for adding or dropping a selected wavelength or a group of wavelengths as well as multiplexing a plurality of signals into a multiplexed signal or demultiplexing a multiplexed signal into several signals. For simplicity, a group of selected wavelengths or channels will be deemed or described as a selected wavelength hereinafter. According to one aspect of the present invention, an assembly is described. To ensure that all collimators are on one side to facilitate efficient packaging, all collimators are positioned on both sides of a substrate. Thus one or more beam folding components are used to fold a light beam up and down through the collimators on top of the substrate and bottom of the substrate.

Depending on implementation, different means are provided to ensure that the collimators are securely boned to the substrate. According to one embodiment, wedges are used to hold each of the collimators. Depending on the shape of the collimators, the wedges are designed in different shape to prove a best contact with the collimators.

The present invention may be implemented in many ways as a subsystem, a device or a method. According to one embodiment, the present invention is an optical assembly. The optical assembly comprises at least a common collimator; a substrate; an array of channel collimators including an upper set of collimators and a lower set of collimators, wherein the upper set of collimators is mounted on top of the substrate, and the lower set of collimators is mounted on bottom of the substrate; one or more beam folding components mounted near an end of the substrate, wherein the one or more of the beam folding components turn a light beam traveling through the upper set of collimators to the lower set of collimators, or a light beam traveling through the lower set of collimators to the upper set of collimators, wherein all of the collimators and the common collimator are on one side of the beam folding components.

Objects, features, and advantages of the present invention will become apparent upon examining the following detailed description of an embodiment thereof, taken in conjunction with the attached drawings

BRIEF DESCRIPTION OF THE DRAWINGS

These and other features, aspects, and advantages of the present invention will become better understood with regard to the following description, appended claims, and accompanying drawings where:

FIG. 5 replicates a device of U.S. Pat. No. 7,068,880 that is similar to that of FIG. 4;

FIG. 6A shows an structure according to one embodiment of the present invention;

FIG. 6B illustrates a ray-tracing plot for the structure of FIG. 6A;

DETAILED DESCRIPTION OF THE PREFERRED EMBODIMENT

Figure 1:
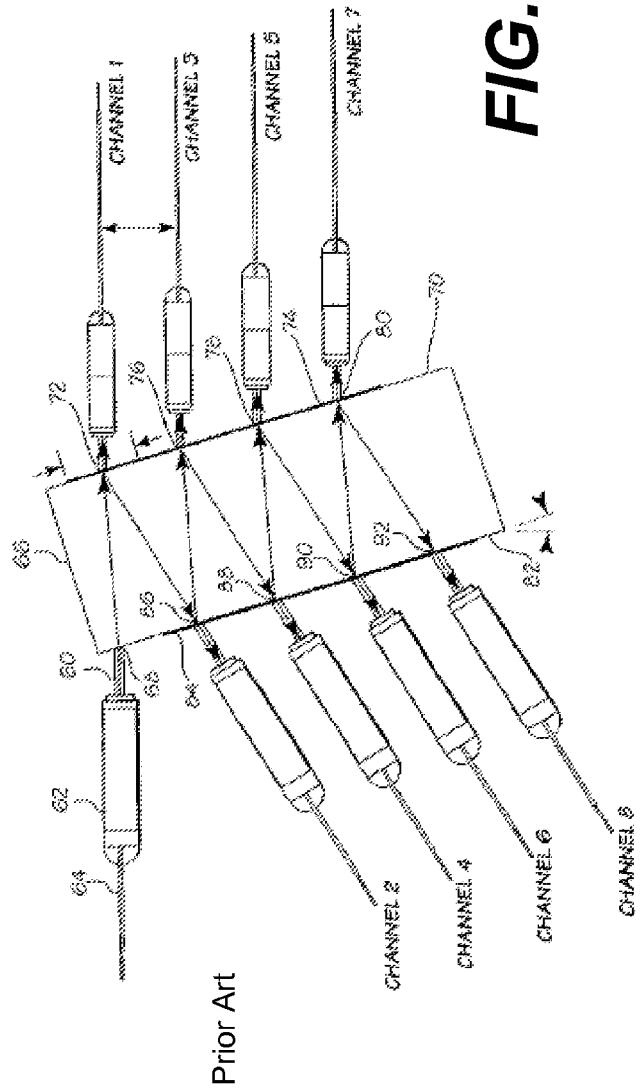
FIG. 1 replicates a WDM device disclosed in U.S. Pat. No. 5,583,683.
Figure 2B:
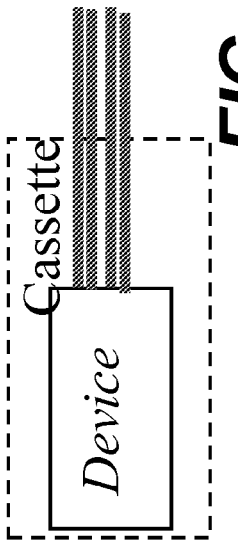
FIG. 2B shows that all the I/O ports are deposed on one side of a device.
Figure 2A:
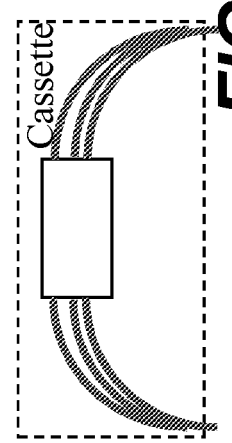
FIG. 2A shows that a could be doubled due to the minimum radius limitation.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Referring now to the drawings, in which like numerals refer to like parts throughout the several views. FIG. 6A shows an structure 600 according to one embodiment of the present invention. The structure has two levels, an upper level and a lower level, separated by a substrate 602. A light beam at the upper level is turned vertically by a trapezoid prism 604 vertically mounted and then turned again by the same prism 604 to the lower level. As a result, the beam comes back to the same side of the structure 600, namely input and output ports can be mounted on one side of the structure 600.

FIG. 6B illustrates a ray-tracing plot 650 for the structure 600 of FIG. 6A. The beam from a common collimator at the upper level is folded by a prism to the lower level, then split by a thin film filter through which an in-band signal passes. The passed signal is then coupled out by a collimator, while all other band signals are directed to the same retro-reflecting prism and folded to the upper level again. After several rounds of optical splitting by filters and optical folding by the prism, different band signals in the incoming signal are dropped to respective ports (all on the same side).

This kind of splitting propagation produces a Demux device. If the beam travels in a reversed manner, the device works as a combining mode, resulting in a Mux device. It can be appreciated by those skilled in the art that each of the embodiments described herein works in either mode (Mux or Demux). FIG. 7A shows an exemplary 4-channel free-space Demux 700 with one prism block 702 while FIG. 7B shows an exemplary corresponding 4-channel free-space Mux 720 with one prism block 704.

Figures 3A, 3B, 3C:
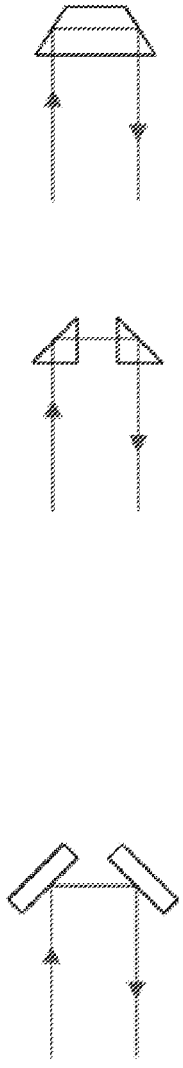
FIGS. 3A-3C shows some exemplary beam folding components.
Figure 4:
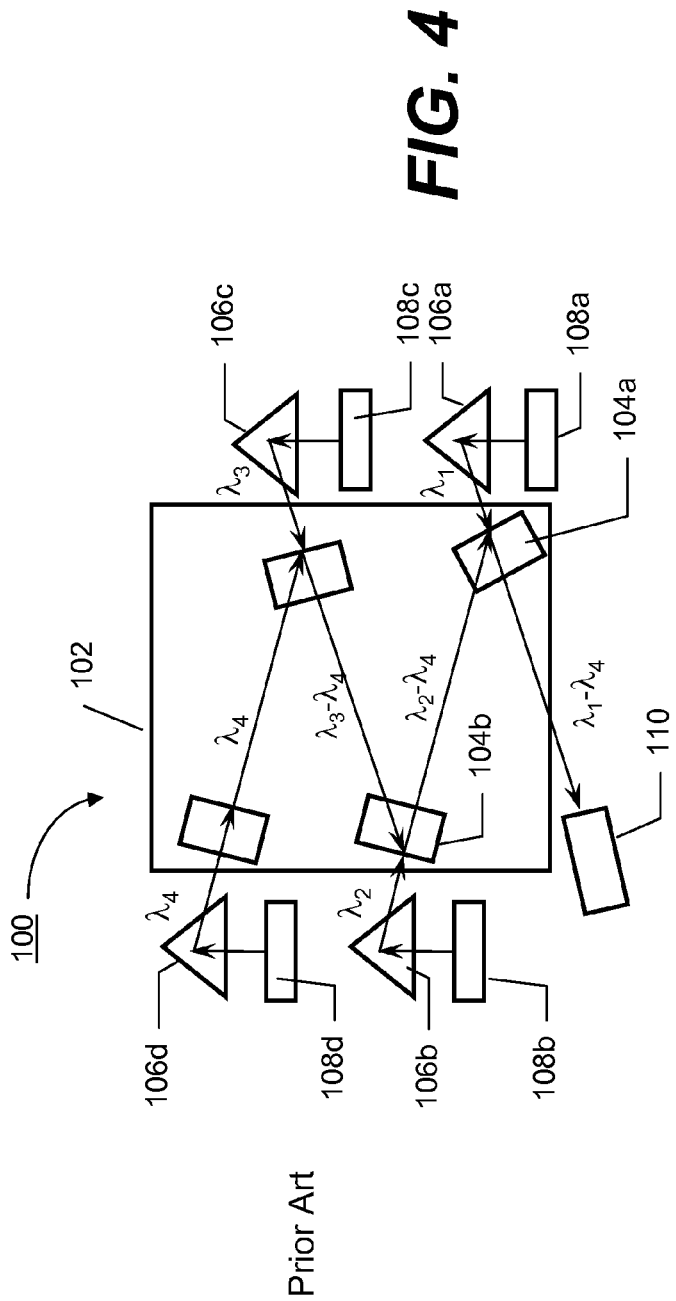
FIG. 4 replicates an optical device of U.S. Pat. No. 6,847, 450 using turning prisms to bend light beams from adding channel collimators vertical to the main plane (beam cascading plane)
Figure 7B:
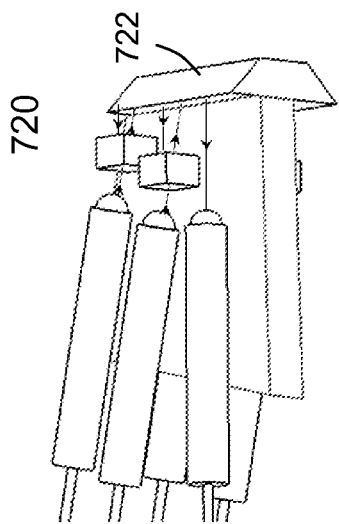
FIG. 7B shows an exemplary corresponding 4-channel free-space Mux with one prism block.
Figure 7A:
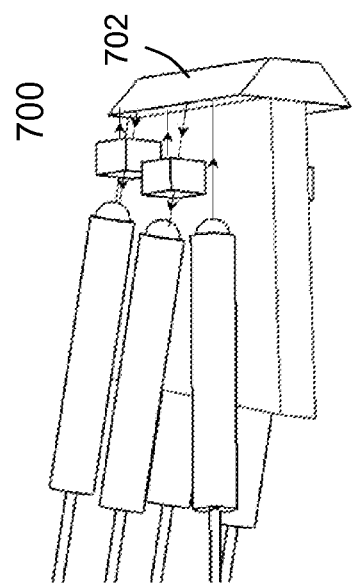
FIG. 7A shows an exemplary 4-channel free-space Demux with one prism block.
Figure 8:
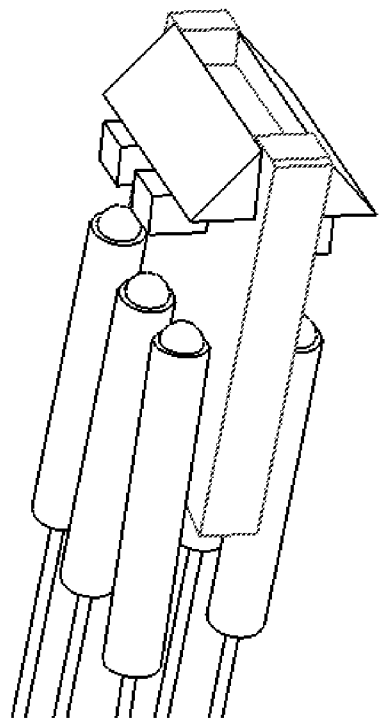
FIG. 8 shows that two halves of a prism can even be mounted to the two horizontal surfaces of the substrate.

As shown in FIG. 7A and FIG. 7B, the prism block or prism 702 or 722 is mounted to the end of the substrate. If the prism is cut into two halves as shown in FIG. 3B, they may be mounted on the end vertical surface of the substrate, just like one-prism design. FIG. 8 shows that two halves of the prism can even be mounted to the two horizontal surfaces of the substrate. The edges of two prisms are standing on the extended surfaces of the substrate. The substrate may be designed in various forms to support two prisms or two halves of a prism. Any mechanical designs of the substrate that supports two reflection components (prisms, mirrors, or even filters) to make a beam for a U-turn shall be considered within scope of the present invention.

Figure 9:
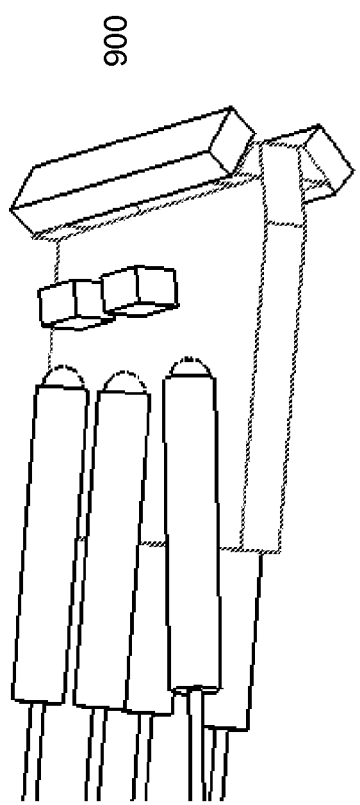
FIG. 9 shows a structure with two reflection filters or mirrors

FIG. 9 shows a structure 900 with two reflection filters or mirrors. These two mirrors are mounted on one or two slant wedges attached to the substrate to fold a beam. These wedges may be separated with the substrate or be part of the substrate. The beam from a common collimator or a filter hits the mirror above the substrate and is turned to vertical or similar direction. The turned beam hits the other mirror underneath the substrate and is turned again to the reverse direction to the incident direction. After reflected by the filters on the lower level, the beam comes back to the lower mirror that turns it to the upper mirror and then to the upper filter again. Depending on implementation, the mirrors may be exchangeable with optical filters.

The design of FIG. 9 takes the benefit of simplicity. But due to the existence of common collimators being slanted, the fiber I/O is not entirely one-sided as commonly understood. If the incidence angle is large, this angular offset of the common port is serious and may not be acceptable for packaging in some applications.

Figure 10:
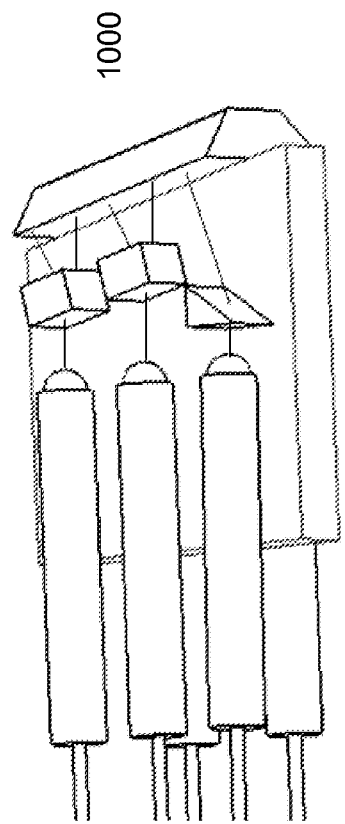
FIG. 10 shows one embodiment overcoming the slant collimators and uses a prism to redirect the beam so as to keep to keep the collimator parallel

FIG. 10 shows that one embodiment 1000 overcomes the arrangement of having a slanted collimator and uses a prism to redirect the beam so as to keep the collimator in parallel. As a result, a common collimator can be aligned with other channel collimators.

Figure 11A:
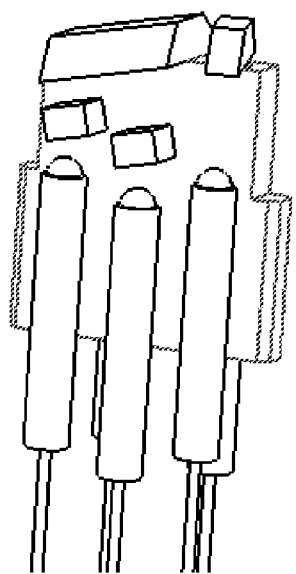
FIG. 11 shows another embodiment using a slant mounted retro-reflection prism to send the beam from the common port to the lower level and project to a first channel filter and then a first channel collimator.
Figure 11B:
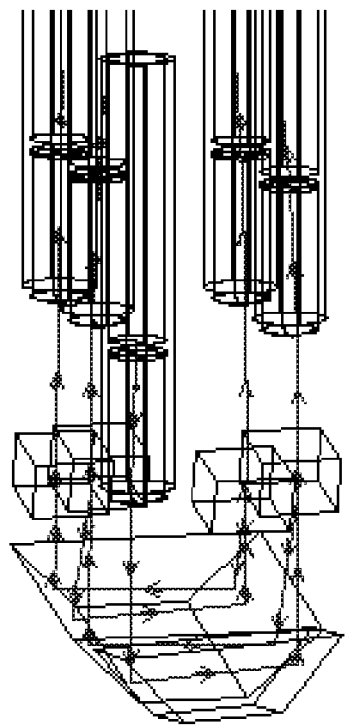
Figure 12A:
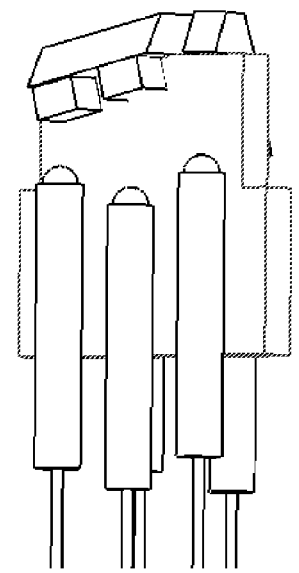
FIG. 12A and FIG. 12B show respectively filters can be directly bonded with a prisms to avoid the requirement of having a good sidewall of the substrate.
Figure 12B:
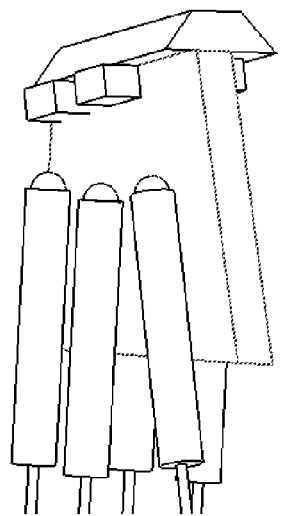

FIG. 11 shows another embodiment 1100 using a slant mounted retro-reflection prism to send the beam from the common port to the lower level and project to a first channel filter and then a first channel collimator. Through the reflection of the first filter, the beam enters the cycle of splitting by filters and folding by a second prism. The filters can be bonded to the substrate surfaces. This requires a good sidewall for each of the filters. To avoid the requirement of having a good sidewall of the substrate, these filters can be directly bonded with the prisms as shown in FIG. 12A and FIG. 12B.

Figure 13:
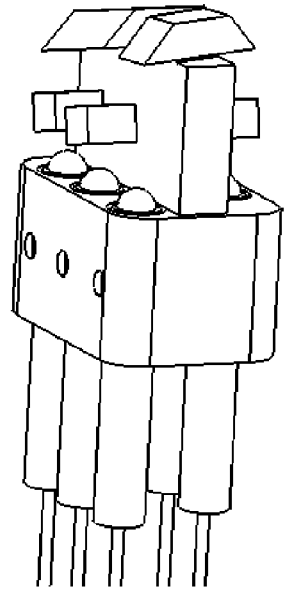
FIG. 13 shows a structure with a substrate end for two extruded widgets.

FIG. 13 shows a structure 1300 with a substrate end for two extruded wegets. Mounting holes are designed in the widgets to hold the collimators. A type of adhesive (e.g., epoxy) is applied to secure the position of the collimators to the widget. The mounting holes are an example to hold the collimators, other means such as V-grooves may be used to hold the collimators as well.

Figure 14B:
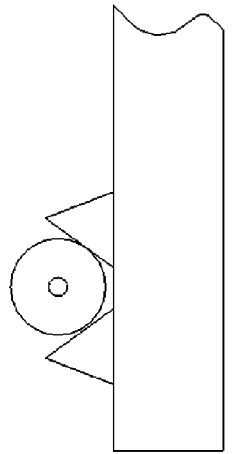
FIG. 14A to FIG. 14D show respectively four different mounting means using wedges.

Another mounting method is to use flexible bridges or wedges. To mount a collimator to a flat substrate, the bridge block has two touch surfaces: one with the collimator, the other with substrate. Since the substrate is flat, the best contact is a flat surface. But a collimator has a cylindrical or similar outer shape, the contact surface can be more flexible. If this contact surface is also flat, then the bridge block is a wedge. FIG. 14A and FIG. 14B show two different mounting means using such wedges.

Figure 14D:
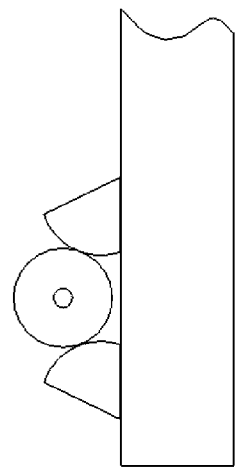
Figure 14A:
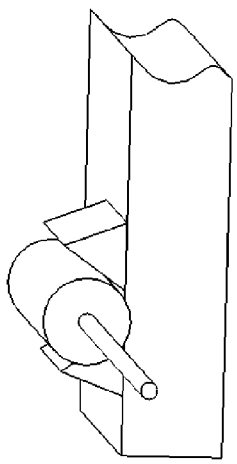
Figure 14C:
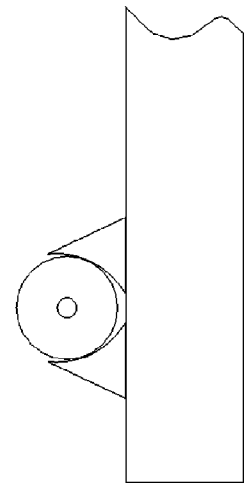

If the surface is curved, curved wedges may be used as shown respectively in FIG. 14C and FIG. 14D. Depending on implementation, there are other types of wedges that may be used. The wedges can be used individually, but for better bonding, the wedges are better to be used in pair. With a pair of bridges, four contact surfaces are involved to secure the support between collimators and the substrate.

Figure 15B:
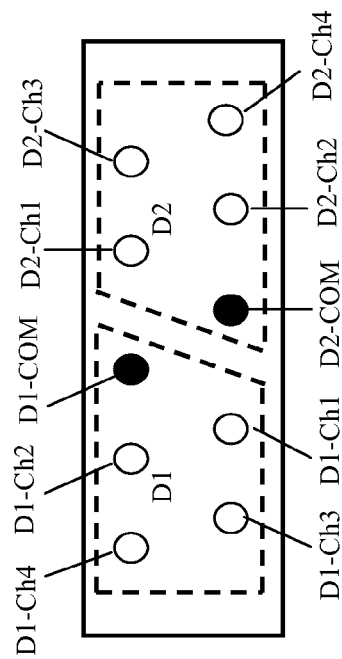
FIG. 15B shows ports of two devices are laid out in a complementary arrangement.
Figure 15A:
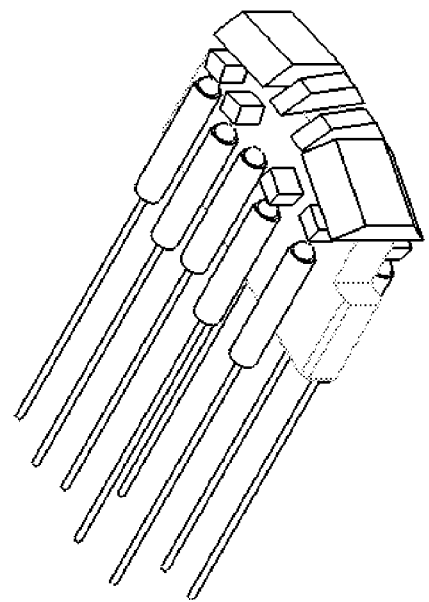
FIG. 15A shows an exemplary structure for mounting two 4-channel devices in one enclosure.
Figure 16B:
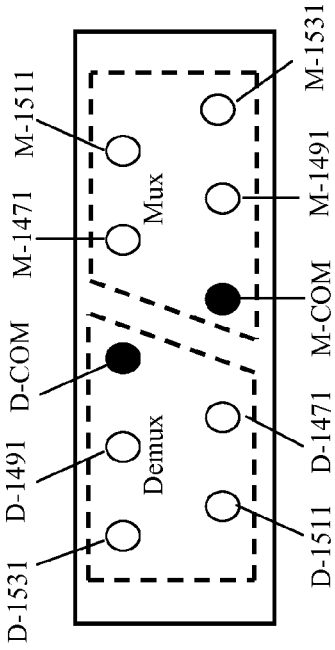
FIG. 16A-FIG. 16D demonstrate respectively four coarse WDM (CWDM) channel plans for Mux/Demux pair ("M" for Mux, "D" for "Demux")
Figure 16D:
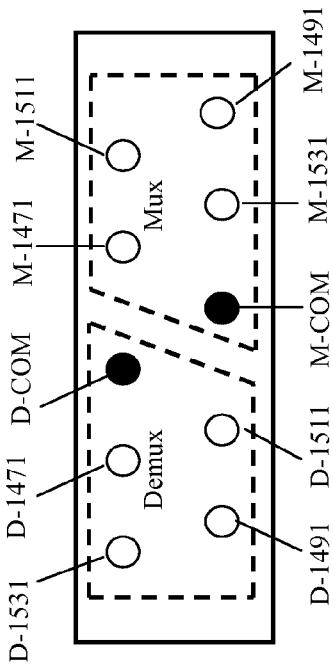
Figure 16A:
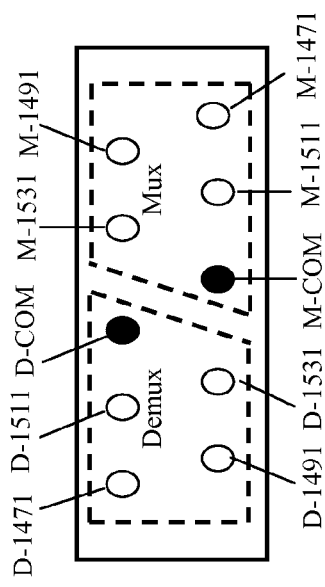
Figure 16C:
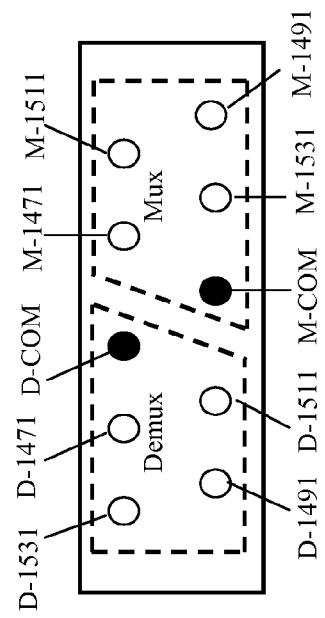

In some network designs, two or more similar devices are required to be mounted at the same location. Mux/Demux pair is a typical setting. In one embodiment, an array of Mux/Demux devices is mounted on one substrate and within one enclosure to save space and cost. FIG. 15A shows an exemplary structure for mounting two 4-channel devices in one enclosure. The ports of two devices are laid out in a complementary manner as shown in FIG. 15B.

For a first device D1, there are three ports ("D1-COM", "D1-Ch2", and "D1-Ch4") are on the upper row and two ("D1-Ch1" and "D1-Ch3") on the lower row. For a second device, there are two ports ("D2-Ch1" and "D2-Ch3") are on the upper row and three ports ("D2-COM","D2-Ch2", and "D2-Ch4") on the lower row. These two devices operate independently. Two individual optical signal inputs or outputs "D1-COM" or "D2-COM" port are Demux or Mux, respectively. The drop or add signals are separated via the channel ports ("D1-Ch1","D1-Ch2, . . . ).

Figures 17A, 17B:
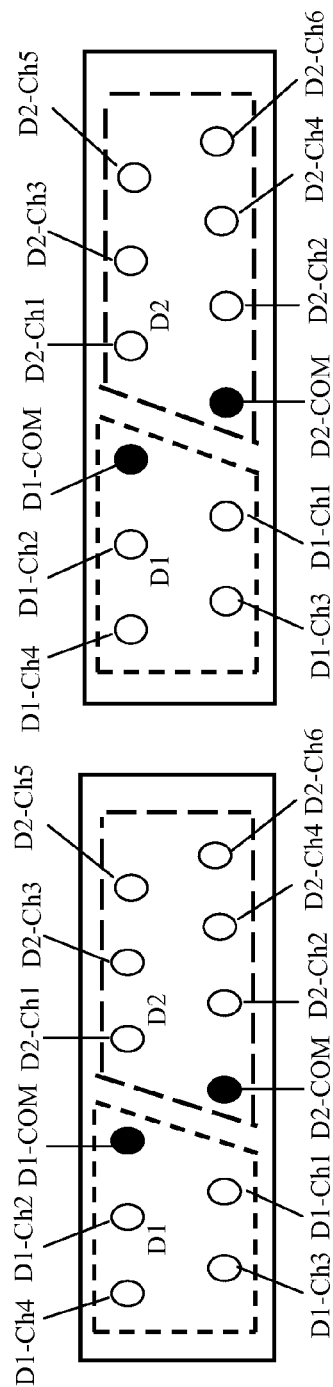
FIG. 17A and FIG. 17B show two more different settings from FIGS. 16A-16D.

It should be noted that the wavelength band for each port and each device can be allocated in a customizable manner, mostly based on application request. And each device in the shared enclosure may have a different wavelength channel layout. FIG. 16A-FIG. 16D demonstrate respectively four coarse WDM (CWDM) channel plans for Mux/Demux pair ("M" for Mux, "D" for "Demux"). It should be also noted that the devices in the array can have the same or different channel count. FIG. 17A and FIG. 17B show two more different settings.

Figure 18A:
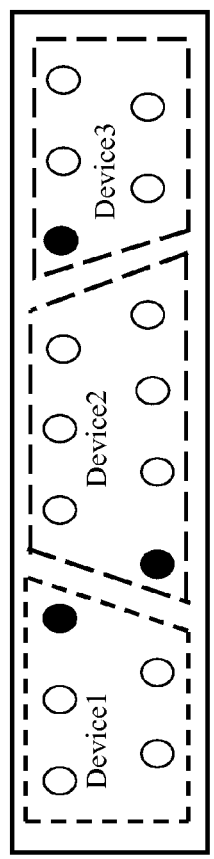
FIG. 18A shows an exemplary stacking of three devices.
Figure 18B:
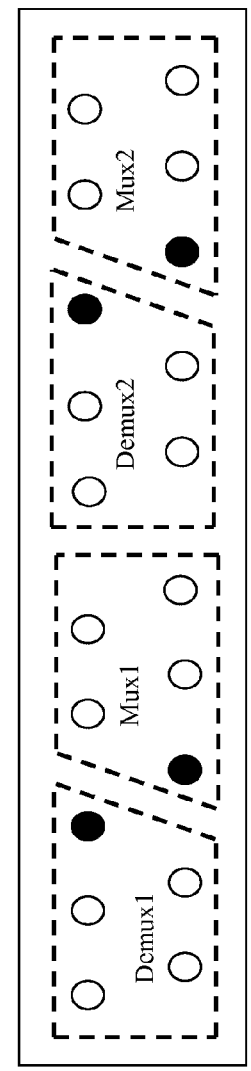
FIG. 18B shows an exemplary stacking of four devices.

More than two devices may be lined up side by side in a similar fashion and the devices in the array can have the same or different channel count. FIG. 18A shows an exemplary stacking of three devices. FIG. 18B shows an exemplary stacking of four devices.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. An optical assembly comprising:
   at least a common collimator;
   a substrate;
   an array of channel collimators including an upper set of collimators and a lower set of collimators, wherein the upper set of collimators coupled to a first set of I/O fibers are mounted on a top of the substrate, and the lower set of collimators coupled to a second set of I/O fibers are mounted on a bottom of the substrate, wherein both of the first and second sets of I/O fibers are disposed on one side of the optical assembly; and
   a single beam folding component mounted near an end of the substrate, wherein the beam folding component turns a light beam traveling through a first one of the upper set of collimators via a first filter to a first one of the lower set of collimators via a second filter, wherein the first filter reflects a signal at a first wavelength and passes a first transmitted signal, and the second filter reflects a signal at a second wavelength from the first transmitted signal and passes a second transmitted signal; and
   the single beam folding component turning the second transmitted signal via a third filter to another one of the upper set of collimators, wherein the third filter reflects a signal at a third wavelength and passes a third transmitted signal that again is turned by the single beam folding component to another one of the lower set of collimators via a fourth filter that reflects a signal at a fourth wavelength from the third transmitted signal and passes a fourth transmitted signal, wherein all of the collimators and the common collimator are on one side of the beam folding components.

2. The optical assembly of claim 1, wherein the beam folding component is mounted on a portion extended from the substrate.

3. The optical assembly of claim 1, wherein the beam folding component is mounted on a side wall of the substrate.

4. The optical assembly of claim 1, wherein the beam folding component is cut into two halves, one being mounted on the top of the substrate and the other being mounted on the bottom of the substrate.

5. The optical assembly of claim 1, wherein the channel collimators are slanted with respect to the common collimator.

6. The optical assembly of claim 5, wherein the channel collimators are arranged in parallel and, together with the common collimator, boned to the substrate so that the optical assembly can be expanded to include more channel collimators.

7. The optical assembly of claim 6, wherein a pair of wedges are used to securely position each of the channel collimators and the common collimator to the substrate.

8. The optical assembly of claim 7, wherein edges of the wedges are curved on one side to accommodate a shape of the each of the channel collimators and the common collimator.

9. The optical assembly of claim 6, where the optical assembly is enclosed in an enclosure that is shaped in a way to accommodate a duplicated optical assembly to extend a frequency range of a laser signal coming to the common collimator.

10. The optical assembly of claim 1, wherein each of the channel collimators is associated with a filter.

11. An optical assembly comprising:
at least a common collimator;
a substrate with a certain thickness to form a side surface;
an array of channel collimators including an upper set of collimators and a lower set of collimators, wherein the upper set of collimators coupled to a first set of I/O fibers is stabilized by one or more wedges and mounted on one side of the substrate, and the lower set of collimators coupled to a first set of I/O fibers is stabilized by one or more wedges and mounted on another side of the substrate, wherein both of the first and second sets of I/O fibers are disposed on one side of the optical assembly; and a folding component mounted onto the side surface of the substrate, wherein the beam folding component turns a light beam traveling through a first one of the upper set of collimators via a first filter to a first one of the lower set of collimators via a second filter, wherein the first filter reflects a signal at a first wavelength and passes a first transmitted signal, and the second filter reflects a signal at a second wavelength from the first transmitted signal and passes a second transmitted signal; and the single beam folding component turning the second transmitted signal via a third filter to another one of the upper set of collimators, wherein the third filter reflects a signal at a third wavelength and passes a third transmitted signal that again is turned by the single beam folding component to another one of the lower set of collimators via a fourth filter that reflects a signal at a fourth wavelength from the third transmitted signal and passes a fourth transmitted signal, wherein all of the collimators and the common collimator are on one side of the beam folding component.

12. The optical assembly of claim 11, wherein the channel collimators and the common collimator are arranged in parallel and boned to the substrate.

13. The optical assembly of claim 12, wherein the wedges are shaped in such a way that the wedges securely position each of the channel collimators and the common collimator to the substrate.

14. The optical assembly of claim 13, wherein edges of the wedges are curved on one side to accommodate a shape of the each of the channel collimators and common collimator.

15. The optical assembly of claim 11, wherein each of the one or more beam folding components is a prism.

16. The optical assembly of claim 11, wherein each of the one or more beam folding components is a pair of mirrors.

17. The optical assembly of claim 11, wherein each of the channel collimators is associated with a filter.

* * * * *